United States Patent
Bi (10) Patent No.: US 6,735,563 B1
(45) Date of Patent: *May 11, 2004

(54) METHOD AND APPARATUS FOR CONSTRUCTING VOICE TEMPLATES FOR A SPEAKER-INDEPENDENT VOICE RECOGNITION SYSTEM

(75) Inventor: Ning Bi, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 09/615,572

(22) Filed: Jul. 13, 2000

(51) Int. Cl.[7] .......................... G10L 15/04; G10L 15/06; G10L 15/08
(52) U.S. Cl. ........................................ 704/241; 704/245
(58) Field of Search .................................. 704/238, 239, 704/241, 245, 253, 236, 254

(56) References Cited

U.S. PATENT DOCUMENTS

| | | | | |
|---|---|---|---|---|
| 4,415,767 A | * | 11/1983 | Gill et al. .................... | 704/243 |
| 4,797,929 A | * | 1/1989 | Gerson et al. ............... | 704/243 |
| 4,802,224 A | | 1/1989 | Shiraki et al. | |
| 4,855,910 A | * | 8/1989 | Bohning .................... | 324/309 |
| 4,905,288 A | * | 2/1990 | Gerson et al. ............... | 704/245 |
| 5,337,394 A | * | 8/1994 | Sejnoha .................... | 704/241 |
| 5,414,796 A | | 5/1995 | Jacobs et al. | |
| 5,682,464 A | * | 10/1997 | Sejnoha .................... | 704/238 |
| 5,732,394 A | * | 3/1998 | Nakadai et al. ............. | 704/255 |
| 5,839,103 A | * | 11/1998 | Mammone et al. ......... | 704/232 |
| 6,266,643 B1 | * | 7/2001 | Canfield et al. ............ | 704/278 |
| 6,278,972 B1 | * | 8/2001 | Bi et al. .................... | 704/248 |
| 6,519,561 B1 | * | 2/2003 | Farrell et al. ............... | 704/232 |

OTHER PUBLICATIONS

Rabiner L., et al. "Fundamentals of Speech Recognition," Prentice Hall, 1993 (cited in the application p. 382, 284).

* cited by examiner

Primary Examiner—Richemond Dorvil
Assistant Examiner—Martin Lerner
(74) Attorney, Agent, or Firm—Philip Wadsworth; Charles Brown; Kyong Macek (57) ABSTRACT

A method and apparatus for constructing voice templates for a speaker-independent voice recognition system includes segmenting a training utterance to generate time-clustered segments, each segment being represented by a mean. The means for all utterances of a given word are quantized to generate template vectors. Each template vector is compared with testing utterances to generate a comparison result. The comparison is typically a dynamic time warping computation. The training utterances are matched with the template vectors if the comparison result exceeds at least one predefined threshold value, to generate an optimal path result, and the training utterances are partitioned in accordance with the optimal path result. The partitioning is typically a K-means segmentation computation. The partitioned utterances may then be re-quantized and re-compared with the testing utterances until the at least one predefined threshold value is not exceeded.

26 Claims, 4 Drawing Sheets

METHOD AND APPARATUS FOR CONSTRUCTING VOICE TEMPLATES FOR A SPEAKER-INDEPENDENT VOICE RECOGNITION SYSTEM

BACKGROUND OF THE INVENTION

I. Field of the Invention

The present invention pertains generally to the field of communications, and more specifically to voice templates for speaker-independent voice recognition systems.

II. Background

Voice recognition (VR) represents one of the most important techniques to endow a machine with simulated intelligence to recognize user or user-voiced commands and to facilitate human interface with the machine. VR also represents a key technique for human speech understanding. Systems that employ techniques to recover a linguistic message from an acoustic speech signal are called voice recognizers. The term "voice recognizer" is used herein to mean generally any spoken-user-interface-enabled device. A voice recognizer typically comprises an acoustic processor and a word decoder. The acoustic processor extracts a sequence of information-bearing features, or vectors, necessary to achieve VR of the incoming raw speech. The word decoder decodes the sequence of features, or vectors, to yield a meaningful and desired output format such as a sequence of linguistic words corresponding to the input utterance.

The acoustic processor represents a front-end speech analysis subsystem in a voice recognizer. In response to an input speech signal, the acoustic processor provides an appropriate representation to characterize the time-varying speech signal. The acoustic processor should discard irrelevant information such as background noise, channel distortion, speaker characteristics, and manner of speaking. Efficient acoustic processing furnishes voice recognizers with enhanced acoustic discrimination power. To this end, a useful characteristic to be analyzed is the short time spectral envelope. Two commonly used spectral analysis techniques for characterizing the short time spectral envelope are linear predictive coding (LPC) and filter-bank-based spectral modeling. Exemplary LPC techniques are described in U.S. Pat. No. 5,414,796, which is assigned to the assignee of the present invention and fully incorporated herein by reference, and L. B. Rabiner & R. W. Schafer, *Digital Processing of Speech Signals* 396–453 (1978), which is also fully incorporated herein by reference.

The use of VR (also commonly referred to as speech recognition) is becoming increasingly important for safety reasons. For example, VR may be used to replace the manual task of pushing buttons on a wireless telephone keypad. This is especially important when a user is initiating a telephone call while driving a car. When using a phone without VR, the driver must remove one hand from the steering wheel and look at the phone keypad while pushing the buttons to dial the call. These acts increase the likelihood of a car accident. A speech-enabled phone (i.e., a phone designed for speech recognition) would allow the driver to place telephone calls while continuously watching the road. And a hands-free car-kit system would additionally permit the driver to maintain both hands on the steering wheel during call initiation.

Speech recognition devices are classified as either speaker-dependent or speaker-independent devices. Speaker-dependent devices, which are more common, are trained to recognize commands from particular users. In contrast, speaker-independent devices are capable of accepting voice commands from any user. To increase the performance of a given VR system, whether speaker-dependent or speaker-independent, training is required to equip the system with valid parameters. In other words, the system needs to learn before it can function optimally.

A speaker-dependent VR device typically operates in two phases, a training phase and a recognition phase. In the training phase, the VR system prompts the user to speak each of the words in the system's vocabulary once or twice (typically twice) so the system can learn the characteristics of the user's speech for these particular words or phrases. An exemplary vocabulary for a hands-free car kit might include the digits on the keypad; the keywords "call," "send," "dial," "cancel," "clear," "add," "delete," "history," "program," "yes," and "no"; and the names of a predefined number of commonly called coworkers, friends, or family members. Once training is complete, the user can initiate calls in the recognition phase by speaking the trained keywords, which the VR device recognizes by comparing the spoken utterances with the previously trained utterances (stored as templates) and taking the best match. For example, if the name "John" were one of the trained names, the user could initiate a call to John by saying the phrase "Call John." The VR system would recognize the words "Call" and "John," and would dial the number that the user had previously entered as John's telephone number.

A speaker-independent VR device also uses a training template that contains a prerecorded vocabulary of a predefined size (e.g., certain control words, the numbers zero through nine, and yes and no). A large number of speakers (e.g., 100) must be recorded saying each word in the vocabulary.

Conventionally, speaker-independent VR templates are constructed by comparing a testing database containing words spoken by a first set of speakers (typically 100 speakers) to a training database containing the same words spoken by a second set of speakers (as many as the first set). One word, spoken by one user, is typically referred to as an utterance. Each utterance of the training database is first time normalized and then quantized (typically vector quantized in accordance with known techniques) before being tested for convergence with the utterances of the testing database. However, the time normalization technique relies upon information obtained only from individual frames (periodic segments of an utterance) having maximum differences from the previous frame. It would be advantageous to provide a method for building speaker-independent VR templates that uses more of the information in a given utterance. It would be further desirable to increase the accuracy, or convergence, of conventional techniques for building speaker-independent VR templates based upon the type of utterance. Thus, there is a need for a method of constructing speaker-independent speech recognition templates that provides enhanced accuracy and uses a greater amount of information in the utterances.

SUMMARY OF THE INVENTION

The present invention is directed to a method of constructing speaker-independent speech recognition templates that provides enhanced accuracy and uses a greater amount of information in the utterances. Accordingly, in one aspect of the invention, a method of creating speech templates for use in a speaker-independent speech recognition system is provided. The method advantageously includes segmenting each utterance of a first plurality of utterances to generate a plurality of time-clustered segments for each utterance, each time-clustered segment being represented by a spectral mean; quantizing the plurality of spectral means for all of the first plurality of utterances to generate a plurality of template vectors; comparing each one of the plurality of template vectors with a second plurality of utterances to generate at least one comparison result; matching the first plurality of utterances with the plurality of template vectors if the at least one comparison result exceeds at least one predefined threshold value, to generate an optimal matching path result; partitioning the first plurality of utterances in time in accordance with the optimal matching path result; and repeating the quantizing, comparing, matching, and partitioning until the at least one comparison result does not exceed any at least one predefined threshold value.

DETAILED DESCRIPTION OF THE PREFERRED EMBODIMENTS

Figure 1:
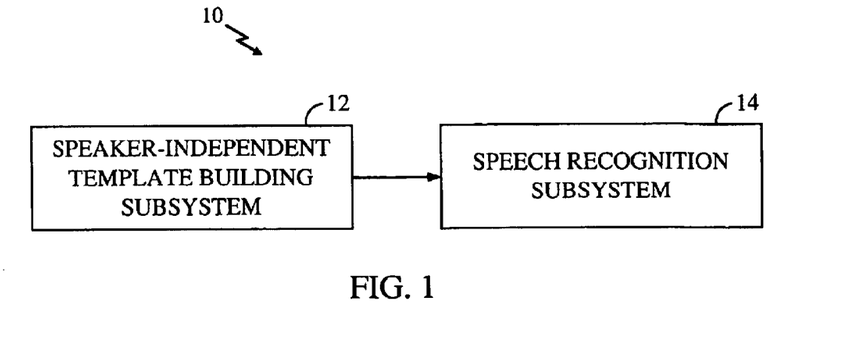
FIG. 1 is a block diagram of a system for constructing and implementing voice templates for speaker-independent voice recognition.

In accordance with one embodiment, as illustrated in FIG. 1, a system 10 for constructing and implementing voice templates for speaker-independent voice recognition includes a speaker-independent template building subsystem 12 and a speech recognition subsystem 14. The speaker-independent template building subsystem 12 is coupled to the speech recognition subsystem 14.

Speaker-independent voice templates are constructed with the speaker-independent template building subsystem 12 as described below with reference to FIGS. 4–6. The templates are provided to the speech recognition subsystem 14 for use in recognizing input speech from a user as described below with reference to FIGS. 2–3.

Figure 2:
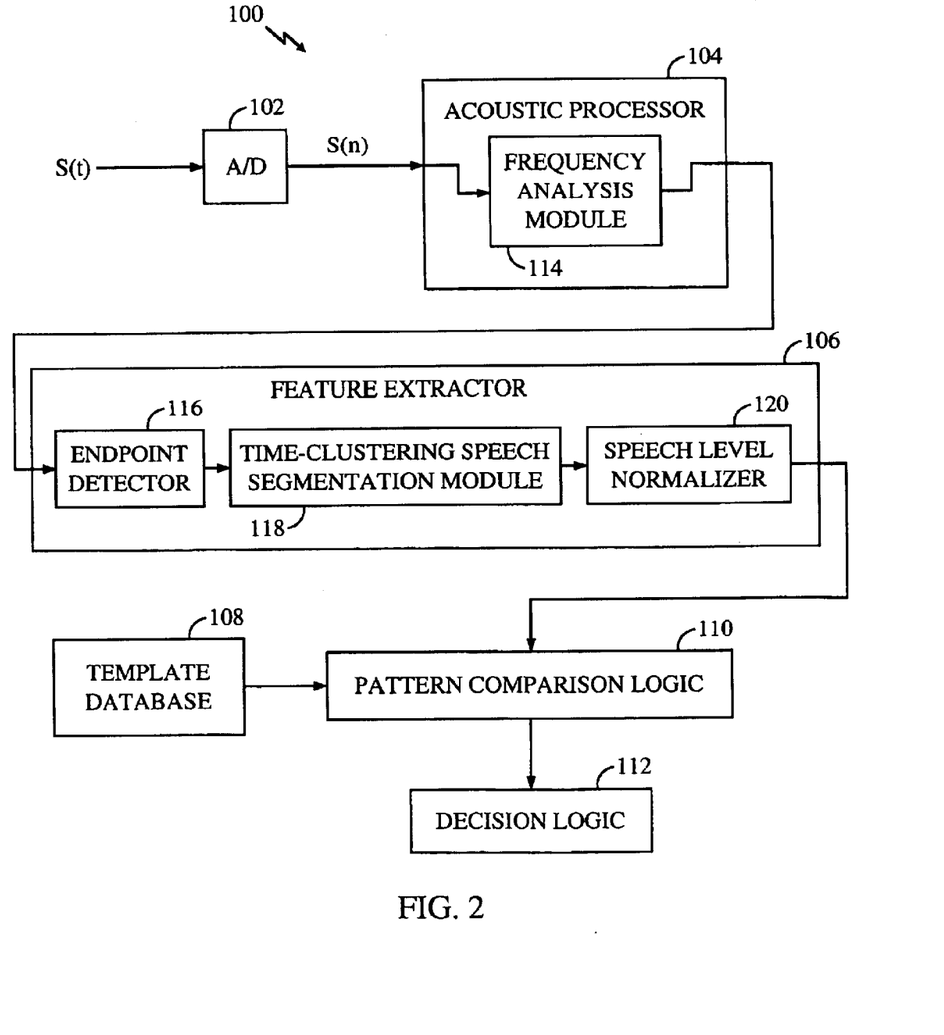
FIG. 2 is a block diagram of a voice recognition subsystem that can be used in the system of FIG. 1.

In accordance with one embodiment, as illustrated in FIG. 2, a speech recognition subsystem 100 includes an analog-to-digital converter (A/D) 102, a front-end acoustic processor 104, a feature extractor 106, a speech template database 108, pattern comparison logic 110, and decision logic 112. In a particular embodiment, the acoustic processor 104 and the feature extractor 106 are implemented as one device, e.g., a parameter extractor. In one embodiment the acoustic processor 104 includes a frequency analysis module 114. In one embodiment the feature extractor 106 includes an endpoint detector 116, a time-clustering speech segmentation module 118, and a speech level normalizer 120.

The A/D 102 is coupled to the acoustic processor 104. The acoustic processor 104 is coupled to the feature extractor 106. In one embodiment, within the feature extractor 106, the endpoint detector 116 is coupled to the time-clustering speech segmentation module 118, which is coupled to the amplitude quantizer 120. The feature extractor 106 is coupled to the pattern comparison logic 110. The pattern comparison logic 110 is coupled to the template database 108 and the decision logic 112.

The speech recognition subsystem 100 may reside in, e.g., a wireless telephone or a hands-free car kit. A user (not shown) speaks a word or phrase, generating a speech signal. The speech signal is converted to an electrical speech signal, s(t), with a conventional transducer (not shown). The speech signal, s(t), is provided to the A/D 102, which converts the speech signal to digitized speech samples, s(n), in accordance with a known sampling method such as, e.g., pulse coded modulation (PCM), A-law, or $\mu$-law.

The speech samples, s(n), are provided to the acoustic processor 104 for parameter determination. The acoustic processor 104 produces a set of parameters that models the characteristics of the input speech signal, s(t). The parameters may be determined in accordance with any of a number of known speech parameter determination techniques including, e.g., speech coder encoding, discrete Fourier transform (DFT)-based cepstrum coefficients (e.g., fast Fourier transform (FFT)-based cepstrum coefficients), linear predictive coefficients (LPCs), or Bark scale analysis, as described in the aforementioned U.S. Pat. No. 5,414,796 and Lawrence Rabiner & Biing-Hwang Juang, *Fundamentals of Speech Recognition* (1993). The set of parameters is advantageously frame based (segmented into periodic frames). The acoustic processor 104 may be implemented as a digital signal processor (DSP). The DSP may include a speech coder. Alternatively, the acoustic processor 104 may be implemented as a speech coder.

Each frame of parameters is provided to the feature extractor 106. In the feature extractor 106, the endpoint detector 116 uses the extracted parameters to detect the endpoints of an utterance (i.e., a word). In one embodiment the endpoint detection is advantageously performed in accordance with a technique described in U.S. Pat. No. 6,324,509, entitled METHOD AND APPARATUS FOR ACCURATE ENDPOINTING OF SPEECH IN THE PRESENCE OF NOISE, assigned to the assignee of the present invention, and fully incorporated herein by reference. In accordance with this technique, the utterance is compared with a first threshold value such as, e.g., a signal-to-noise ratio (SNR) threshold value to determine a first starting point and a first ending point of the utterance. A portion of the utterance that precedes the first starting point is then compared with a second SNR threshold value to determine a second starting point of the utterance. A portion of the utterance that follows the first ending point is then compared with the second SNR threshold value to determine a second ending point of the utterance. The first and second SNR threshold values are advantageously recalculated periodically, and the first SNR threshold value advantageously exceeds the second SNR threshold value.

The frames of frequency-domain parameters for the detected utterance are provided to the time-clustering speech segmentation module 118, which in accordance with one embodiment, implements a compression technique described in U.S. Pat. No. 6,324,509, entitled SYSTEM AND METHOD FOR SEGMENTATION AND RECOGNITION OF SPEECH SIGNALS, assigned to the assignee of the present invention, and fully incorporated herein by reference. In accordance with this technique, each speech frame in the frequency-domain parameters is represented by at least one spectral value associated with the speech frame. A spectral difference value is then determined for each pair of adjacent frames. The spectral difference value represents a difference between the spectral values associated with the two frames in the pair. An initial cluster boundary is set between each pair of adjacent frames, creating clusters in the parameters, and a variance value is assigned to each cluster. The variance value is advantageously equal to one of the determined spectral difference values. A plurality of cluster merge parameters is then calculated, each of the cluster merge parameters being associated with a pair of adjacent clusters. A minimum cluster merge parameter is selected from the plurality of cluster merge parameters. A merged cluster is then formed by canceling a cluster boundary between the clusters associated with the minimum cluster merge parameter and assigning a merged variance value to the merged cluster. The merged variance value represents the variance values assigned to the clusters associated with the minimum cluster merge parameter. The process is advantageously repeated in order to form a plurality of merged clusters, and the segmented speech signal may advantageously be formed in accordance with the plurality of merged clusters.

It would be understood by those skilled in the art that the time-clustering speech segmentation module 118 may be replaced with other devices such as, e.g., a time normalization module. However, it would also be appreciated by skilled artisans that because the time-clustering speech segmentation module 118 merges the frames having minimum differences as compared to the previous frame into clusters, and uses mean averages instead of individual frames, the time-clustering speech segmentation module 118 uses more information in the processed utterance. It would also be understood that the time-clustering speech segmentation module 118 is advantageously used in conjunction with pattern comparison logic 110 that employs a dynamic time warping (DTW) model as known in the art and described below.

The cluster means are provided to the speech level normalizer 120. In one embodiment the speech level normalizer 120 quantizes the speech amplitudes by assigning each cluster mean two bits per channel (i.e., two bits per frequency). In an alternate embodiment in which cepstral coefficients are extracted, the speech level normalizer 120 is not used to quantize the cluster means, as would be understood by those of skill. The output generated by the speech level normalizer 120 is provided by the feature extractor 106 to the pattern comparison logic 110.

A set of templates for all of the vocabulary words of the speech recognition subsystem 100 is permanently stored in the template database 108. The set of templates is advantageously a set of speaker-independent templates constructed with a speaker-independent template building subsystem as described hereinbelow. The template database 108 is advantageously implemented as any conventional form of nonvolatile storage medium, such as, e.g., flash memory. This allows the templates to remain in the template database 108 when the power to the speech recognition subsystem 100 is turned off.

The pattern comparison logic 110 compares the vectors from the feature extractor 106 to all of the templates stored in the template database 108. The comparison results, or distances, between the vectors and all of the templates stored in the template database 108 are provided to the decision logic 112. The decision logic 112 selects from the template database 108 the template that most closely matches the vectors. In the alternative, the decision logic 112 may use a conventional "N-best" selection algorithm, which chooses the N closest matches within a predefined matching threshold. The user is then queried as to which choice was intended. The output of the decision logic 112 is the decision as to which word in the vocabulary was spoken.

In one embodiment the pattern comparison logic 110 and the decision logic 112 use a DTW technique to test for convergence. The DTW technique is known in the art and described in Lawrence Rabiner & Biing-Hwang Juang, *Fundamentals of Speech Recognition* 200–238 (1993), which is fully incorporated herein by reference). In accordance with the DTW technique, a trellis is formed by plotting a time sequence of the utterance to be tested against a time sequence for each utterance stored in the template database 108. The utterance being tested is then compared, point by point (e.g., every 10 ms), with each utterance in the template database 108, one utterance at a time. For each utterance in the template database 108, the utterance being tested is adjusted, or "warped," in time, being either compressed or expanded at particular points until the closest possible match with the utterance in the template database 108 is achieved. At each point in time the two utterances are compared, and either a match is declared at that point (zero cost), or a mismatch is declared. In the event of a mismatch at a particular point, the utterance being tested is compressed, expanded, or if necessary, mismatched. The process is continued until the two utterances have been completely compared against each other. A large number (typically thousands) of differently adjusted utterances is possible. The adjusted utterance having the lowest cost function (i.e., requiring the least number of compressions and/or expansions and/or mismatches) is selected. In similar fashion to a Viterbi decoding algorithm, the selection is advantageously performed by looking backward from each point in the utterance in the template database 108 to determine the pathway having the lowest total cost. This permits the lowest-cost (i.e., most closely matched) adjusted utterance to be determined without resorting to the "brute-force" method of generating every possible one of the differently adjusted utterances. The lowest-cost adjusted utterances for all of the utterances in the template database 108 are then compared and the one having the lowest cost is selected as the stored utterance most closely matched to the tested utterance.

The pattern comparison logic 110 and the decision logic 112 may advantageously be implemented as a microprocessor. The speech recognition subsystem 100 may be, e.g., an ASIC. The recognition accuracy of the speech recognition subsystem 100 is a measure of how well the speech recognition subsystem 100 correctly recognizes spoken words or phrases in the vocabulary. For example, a recognition accuracy of 95% indicates that the speech recognition subsystem 100 correctly recognizes words in the vocabulary ninety-five times out of 100.

Figure 3:
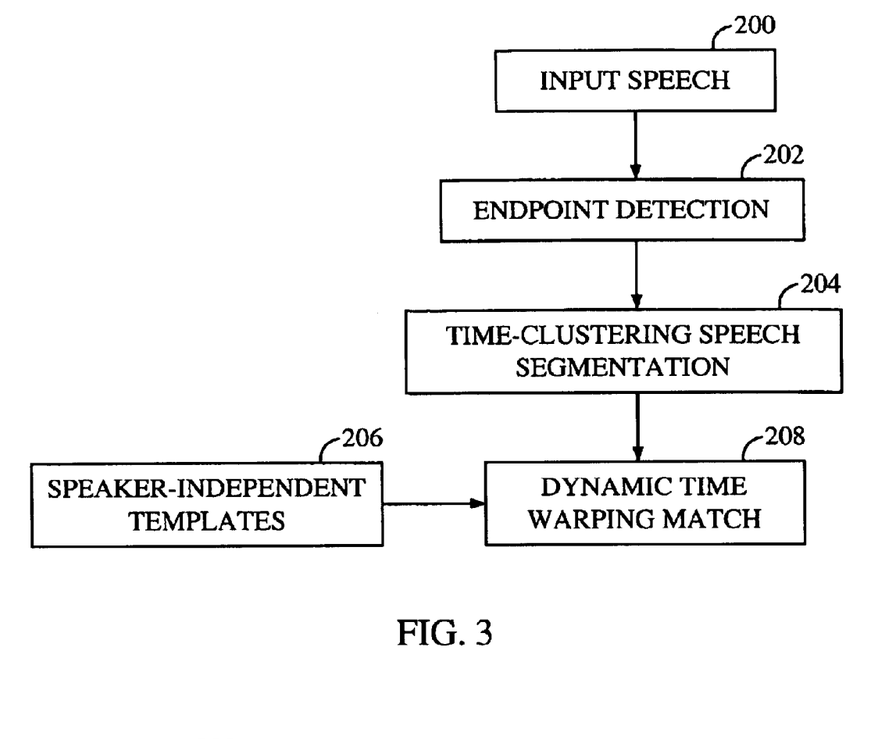
FIG. 3 is a flow chart illustrating method steps performed by a voice recognition subsystem, such as the subsystem of FIG. 2, to recognize input speech samples.

In accordance with one embodiment, a speech recognition subsystem (not shown) performs the algorithm steps illustrated in the flowchart of FIG. 3 to recognize speech input to the speech recognition subsystem. In step 200 input speech is provided to the speech recognition subsystem. Control flow then proceeds to step 202. In step 202 the endpoints of an utterance are detected. In a particular embodiment the endpoints of the utterance are detected in accordance with the technique described in the aforementioned U.S. application Ser. No. 09/246,414, as described above with reference to FIG. 2. Control flow then proceeds to step 204.

In step 204 time-clustering speech segmentation is performed on the extracted utterances. In a particular embodiment the time-clustering speech segmentation technique used is the technique described in the aforementioned U.S. Pat. No. 6,278.972 as described above with reference to FIG. 2. Control flow then proceeds to step 208. In step 206 speaker-independent templates are provided for matching with the speech cluster means generated in step 204. The speaker-independent templates are advantageously constructed in accordance with techniques described below with reference to FIGS. 4–6. Control flow then proceeds to step 208. In step 208 a DTW match is performed between the clusters for a particular utterance and all of the speaker-independent templates, and the closest matching template is selected as the recognized utterance. In a particular embodiment the DTW match is performed in accordance with techniques described in Lawrence Rabiner & Biing-Hwang Juang, *Fundamentals of Speech Recognition* 200–238 (1993) and above with reference to FIG. 2. It would be understood by those of skill in the art that methods other than time-clustering speech segmentation could be performed in step 204. Such methods include, e.g., time normalization.

Figure 4:
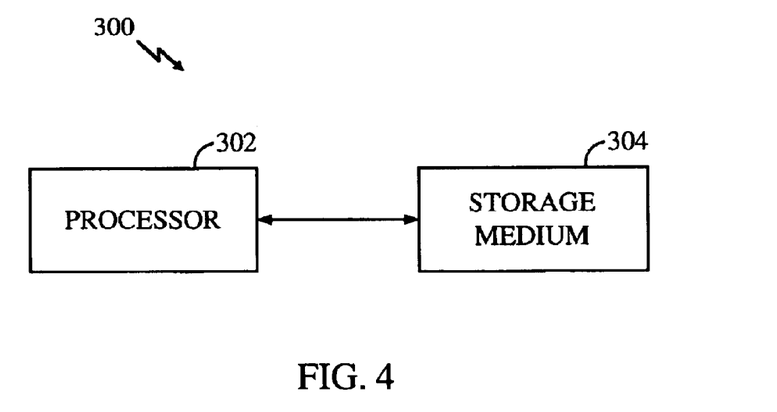
FIG. 4 is a block diagram of a template-building subsystem that can be used in the system of FIG. 1.

In accordance with one embodiment, as shown in FIG. 4, a speaker-independent template building subsystem 300 includes a processor 302 and a storage medium 304. The processor 100 is advantageously a microprocessor, but may be any conventional form of processor, dedicated processor, digital signal processor (DSP), controller, or state machine. The processor 302 is coupled to the storage medium 304, which is advantageously implemented as flash memory, EEPROM memory, RAM memory, ROM memory configured to hold firmware instructions, a software module to be run on the processor 302, or any other conventional form of memory. The speaker-independent template building subsystem 300 is advantageously implemented as a computer running on the UNIX® operating system. In alternate embodiments the storage medium 304 may be on-board RAM memory, or the processor 302 and the storage medium 304 could reside in an ASIC. In one embodiment the processor 302 is configured to execute a set of instructions contained by the storage medium 304 to perform algorithm steps such as the steps described below with reference to FIG. 6.

Figure 5:
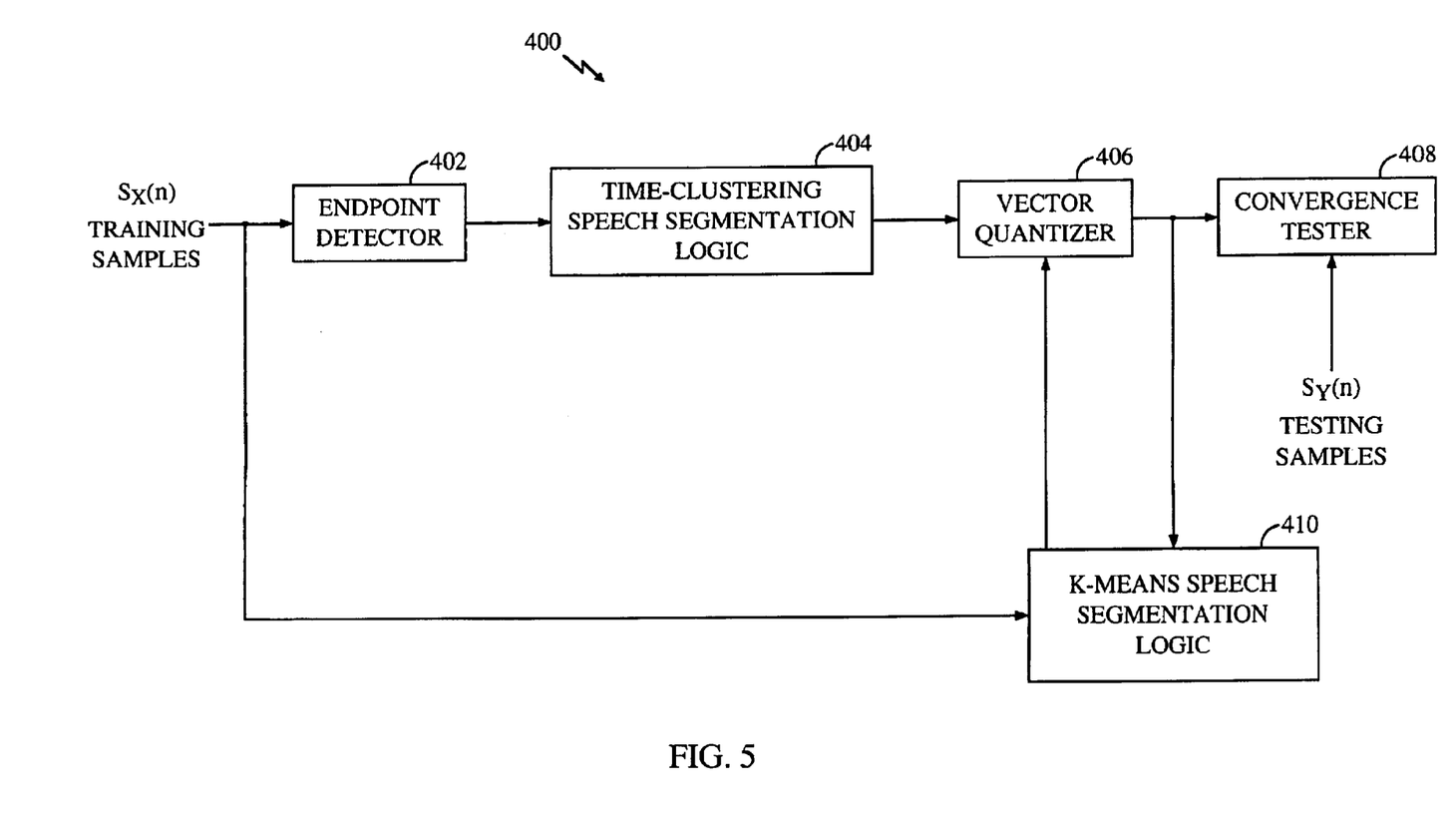
FIG. 5 is a block diagram of a template-building subsystem that can be used in the system of FIG. 1.

In accordance with another embodiment, as shown in FIG. 5, a speaker-independent template building subsystem 400 includes an endpoint detector 402, time-clustering speech segmentation logic 404, a vector quantizer 406, a convergence tester 408, and K-means speech segmentation logic 410. A control processor (not shown) may advantageously be employed to control the number of iterations the speaker-independent template building subsystem 400 performs.

The endpoint detector 402 is coupled to the time-clustering speech segmentation logic 404. The time-clustering speech segmentation logic 404 is coupled to the vector quantizer 406. The vector quantizer 406 is coupled to the convergence tester 408 and to the K-means speech segmentation logic 410. The control processor may advantageously be coupled to the endpoint detector 402, the time-clustering speech segmentation logic 404, the vector quantizer 406, the convergence tester 408, and the K-means speech segmentation logic 410 through a control bus (not shown).

Training samples, $S_x(n)$, of an utterance to be trained are provided in frames to the endpoint detector 402. The training samples are advantageously provided from a training database (not shown) in which utterances to be trained are stored. In one embodiment the training database contains 100 words, each spoken by 100 different speakers, for a total of 10,000 stored utterances. The endpoint detector 402 detects the starting and ending points of an utterance. In one embodiment the endpoint detector 402 operates in accordance with a technique described in the aforementioned U.S. application Ser. No. 09/246,414 and above with reference to FIG. 2.

The endpoint detector 402 provides the detected utterance to the time-clustering speech segmentation logic 404. The time-clustering speech segmentation logic 404 performs a compression algorithm on the detected utterance. In one embodiment the time-clustering speech segmentation logic 404 operates in accordance with a technique described in the aforementioned U.S. Pat. No. 6,278,972 and above with reference to FIG. 2. In one embodiment the time-clustering speech segmentation logic 404 compresses the detected utterance into twenty segments, each segment including a cluster mean.

The time-clustering speech segmentation logic 404 provides the cluster means for all of the training utterances for a given word to the vector quantizer 406. The vector quantizer 406 vector quantizes the cluster means for the utterances (i.e., for all speakers of the same word) and provides the resultant vectors as a potential speaker-independent (SI) template for the utterances to the convergence tester 408. The vector quantizer 406 advantageously operates in accordance with any of various known vector quantization (VQ) techniques. Various VQ techniques are described in, e.g., A. Gersho & R. M. Gray, *Vector Quantization and Signal Compression* (1992). In a particular embodiment, the vector quantizer 406 generates four-cluster vectors. Thus, e.g., each segment is provided serially to the vector quantizer 406, which represents each segment as four clusters. Each cluster represents every speaker for the particular word, and there are multiple clusters per word. In accordance with one embodiment, there are eighty vectors (four clusters times twenty segments) per template.

The convergence tester 408 compares the potential SI templates with testing samples, $S_y(n)$, of utterances to be tested. The testing samples are provided in frames to the convergence tester 408. The testing samples are advantageously provided from a testing database (not shown) in which utterances to be tested are stored. In one embodiment the testing database contains 100 words, each spoken by 100 different speakers, for a total of 10,000 stored utterances. The words are advantageously the same words contained in the training database, but spoken by 100 different speakers. The convergence tester 408 compares the potential SI templates for the utterances to be trained against the samples for the utterances to be tested. In one embodiment the convergence tester 408 is configured to employ a DTW algorithm to test for convergence. The DTW algorithm employed may advantageously be the technique described in Lawrence Rabiner & Biing-Hwang Juang, *Fundamentals of Speech Recognition* 200–238 (1993) and above with reference to FIG. 2.

In one embodiment the convergence tester 408 is configured to analyze both the accuracy of the results for all of the words in the database and the variance of the database with the potential SI template. The variance is first checked, and if the variance falls below a predefined threshold value, the accuracy is then checked. The variance is advantageously calculated per segment and then summed to yield an overall variance value. In a particular embodiment the variance is obtained by calculating the mean square error for the best match of the four clusters. The mean square error technique is well known in the art. The convergence test is defined to be accurate if the utterance from the testing database matches with the potential SI templates generated by the training database (i.e., if recognition is correct for all of the words in the database).

The potential SI template is also provided from the vector quantizer 406 to the K-means speech segmentation logic 410. The K-means speech segmentation logic 410 also receives the training samples, advantageously partitioned into frames. After the convergence tester 408 has performed a first test for convergence, the results for either variance or accuracy may fall below predefined threshold values for variance and accuracy. In one embodiment, if the results for either variance or accuracy fall below the predefined threshold values for variance and accuracy, another iteration is performed. Accordingly, the control processor instructs the K-means speech segmentation logic 410 to perform K-means segmentation on the training samples, thereby generating segmented speech frames as described below. In accordance with the K-means speech segmentation, the training samples are matched with the potential SI template, advantageously with a DTW technique, thereby generating an optimal path as described above with reference to FIG. 2. The training samples are then segmented in accordance with the optimal path. For example, the first five frames of training samples may match with the first frame of the potential SI template, the next three frames of training samples may match with the second frame of the potential SI template, and the next ten frames of the training samples may match with the third frame of the potential SI template. In this case the first five frames of the training samples would be segmented into one frame, the next three frames would be segmented into a second frame, and the next ten frames would be segmented into a third frame. In one embodiment the K-means speech segmentation logic 410 performs K-means segmentation in accordance with an exemplary K-means segmentation technique described in Lawrence Rabiner & Biing-Hwang Juang, *Fundamentals of Speech Recognition* 382–384 (1993), which is fully incorporated herein by reference. The K-means speech segmentation logic 410 then provides the updated frames of cluster means to the vector quantizer 406, which vector quantizes the cluster means and provides the resultant vectors (which comprise the new potential SI template) to the convergence tester 408 to perform another convergence test. One skilled in the art would appreciate that this iteration process may be continued as long as necessary to achieve variance and accuracy results above the predefined threshold values.

Once the convergence test is passed, the potential (now final) SI templates may advantageously be used in a voice recognition subsystem such as the voice recognition subsystem of FIG. 2. The final SI templates would be stored in the template database 108 of FIG. 2, or used in step 206 of the flow chart of FIG. 3.

Figure 6:
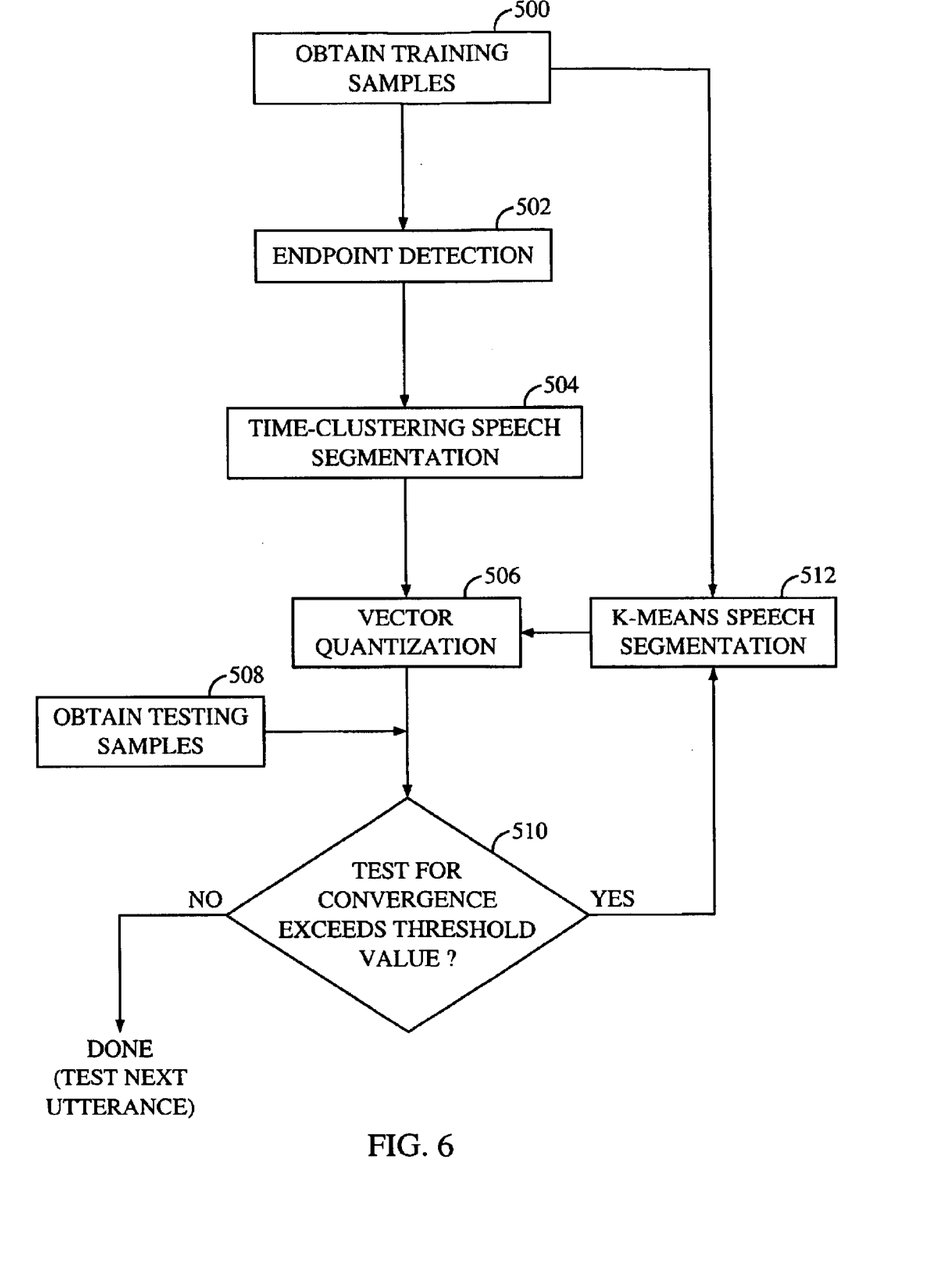
FIG. 6 is a flow chart illustrating method steps performed by a template-building subsystem, such as the subsystem of FIG. 4 or the subsystem of FIG. 5, to construct voice templates.

In one embodiment a speaker-independent template building subsystem (not shown) performs the method steps illustrated in the flowchart of FIG. 6 to construct a speaker-independent template for an utterance. In step 500 training samples of an utterance are obtained from a training database (not shown). The training database advantageously contains a large number of words (e.g., 100 words), each spoken by a large number of speakers (e.g., 100 speakers per word). Control flow then proceeds to step 502.

In step 502 endpoint detection is performed on the training samples to detect an utterance. In one embodiment the endpoint detection is performed in accordance with a technique described in the aforementioned U.S. application Ser. No. 09/246,414 and above with reference to FIG. 2. Control flow then proceeds to step 504.

In step 504 time-clustering speech segmentation is performed on the detected utterance, thereby compressing the utterance into multiple segments, each segment being represented by a mean. In a particular embodiment, the utterance is compressed into twenty segments, each segment including a cluster mean. In one embodiment the time-clustering speech segmentation is performed in accordance with a technique described in the aforementioned U.S. Pat. No. 6.278.972 and above with reference to FIG. 2. Control flow then proceeds to step 506.

In step 506 the cluster means for training samples for all speakers of the same word are vector quantized. In particular embodiments the cluster means are vector quantized in accordance with any one of various known VQ techniques described in A. Gersho & R. M. Gray, *Vector Quantization and Signal Compression* (1992). In a particular embodiment, four-cluster vectors are generated. Thus, e.g., each segment is represented as four clusters. Each cluster represents every speaker for the particular word, and there are multiple clusters per word. In accordance with one embodiment, eighty vectors (four clusters times twenty segments) are generated per template. Control flow then proceeds to step 510.

In step 508 testing samples obtained from a testing database (not shown) to test for convergence. The testing database advantageously contains the same words contained in the training database, each spoken by a large number of speakers (e.g., 100 speakers per utterance). Control flow then proceeds to step 510.

In step 510 the quantized vectors are compared as potential SI templates with the testing samples to test for convergence. In one embodiment the convergence test is a DTW algorithm. The DTW algorithm employed may advantageously be the technique described in Lawrence Rabiner & Biing-Hwang Juang, *Fundamentals of Speech Recognition* 200–238 (1993) and above with reference to FIG. 2.

In one embodiment the convergence test of step 510 analyzes both the accuracy of the results for all of the words in the database and the variance of the database with the potential SI template. The variance is first checked, and if the variance falls below a predefined threshold value, the accuracy is then checked. The variance is advantageously calculated per segment and then summed to yield an overall variance value. In a particular embodiment the variance is obtained by calculating the mean square error for the best match of the four clusters. The mean square error technique is well known in the art. The convergence test is defined to be accurate if the potential SI template generated by the testing database matches with the utterance from the training database (i.e., if recognition is correct for all of the words in the database). Control flow then proceeds to step 512.

In step 512 if the results of the convergence test of step 510 for either variance or accuracy fell below predefined threshold values for variance and accuracy, another iteration is performed. Accordingly, K-means speech segmentation is performed on the training samples. The K-means speech segmentation matches the training samples with the potential SI template, advantageously with a DTW technique, thereby generating an optimal path as described above with reference to FIG. 2. The training samples are then segmented in accordance with the optimal path. In one embodiment the K-means speech segmentation is performed in accordance with a technique described in Lawrence Rabiner & Biing-Hwang Juang, *Fundamentals of Speech Recognition* 382–384 (1993). Control flow then returns to step 506, in which the updated frames of cluster means are vector quantized, and in step 510, tested (as the new potential SI template) for convergence with samples from the testing database. One skilled in the art would appreciate that this iteration process may be continued as long as necessary to achieve variance and accuracy results above the predefined threshold values.

Once the convergence test is passed (i.e., once the threshold values are achieved), the potential (now final) SI templates may advantageously be used in a voice recognition subsystem such as the voice recognition subsystem of FIG. 2. The final SI templates would be stored in the template database 108 of FIG. 2, or used in step 206 of the flow chart of FIG. 3.

Thus, a novel and improved method and apparatus for constructing voice templates for a speaker-independent voice recognition system have been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone. In the alternative, the processor and the storage medium may reside in a telephone. The processor may be implemented as a combination of a DSP and a microprocessor, or as two microprocessors in conjunction with a DSP core, etc.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method of creating speech template for uses a speaker-independent speech recognition system, the method comprising:
   segmenting each utterance of a first plurality of utterances to generate a plurality of time-clustered segments for each utterance, each time-clustered segment being represented by a spectral mean;
   quantizing the plurality of spectral means for all of the first plurality of utterances to generate a plurality of template vectors;
   comparing each one of the plurality of template vectors with a second plurality of utterances using a dynamic time warping calculation to generate at least one comparison result;
   matching the first plurality of utterances with the plurality of template vectors if the at least one comparison result exceeds at least one predefined threshold value, to generate an optimal matching path result;
   partitioning the first plurality of utterances in time in accordance with the optimal matching path result; and
   repeating the quantizing, comparing, matching, and partitioning until the at least one comparison result does not exceed any at least one predefined threshold value.

2. The method of claim 1, wherein the comparing comprises calculating a variance measure.

3. The method of claim 1, wherein the comparing comprises calculating an accuracy measure.

4. The method of claim 1, wherein the comparing comprises first calculating a variance measure, and second, if the variance measure does not exceed a first predefined threshold value, calculating an accuracy measure.

5. The method of claim 4, wherein the matching comprises matching the first utterance with the plurality of template vectors if either the variance measure exceeds the first predefined threshold value or the accuracy measure exceeds a second predefined threshold value.

6. The method of claim 1, wherein the matching comprises performing a dynamic time warping computation.

7. The method of claim 1, wherein the matching and the partitioning comprising performing a K-means segmentation computation.

8. The method of claim 1, further comprising detecting endpoints of the first utterance.

9. An apparatus configured to create speech templates for use in a speaker-independent speech recognition system, the apparatus comprising:
   means for segmenting each utterance of a first plurality of utterances to generate a plurality of time-clustered segments for each utterance, each time-clustered segment being represented by a spectral mean;
   means for quantizing the plurality of spectral means for all of the first plurality of utterances to generate a plurality of template vectors;
   means for using a dynamic time warping calculation to compare each one of the plurality of template vectors with a second plurality of utterances to generate at least one comparison result;
   means for matching the first plurality of utterances with the plurality of template vectors if the at least one comparison result exceeds at least one predefined threshold value, to generate an optimal matching path result;
   means for partitioning the first plurality of utterances in time in accordance with the optimal matching path result; and
   means for repeating the quantizing, comparing, matching, and partitioning until the at least one comparison result does not exceed any at least one predefined threshold value.

10. An apparatus configured to create speech templates for use in a speaker-independent speech recognition system, the apparatus comprising:
    segmentation logic configured to segment each utterance of a first plurality of utterances to generate a plurality of time-clustered segments for each utterance, each time-clustered segment being represented by a spectral mean;
    a quantizer coupled to the segmentation logic and configured to quantize the plurality of spectral means for all of the first plurality of utterances to generate a plurality of template vectors;
    a convergence test coupled to the quantizer and configured to compare each one of the plurality of template vectors with a second plurality of utterances using a dynamic time warping calculation to generate at least one comparison result; and
    partitioning logic coupled to the quantizer and the convergence tester, and configured to match the first plurality of utterances with the plurality of template vectors if the at least one comparison result exceeds at least one predefined threshold value, to generate an optimal matching path result, and to partition the first plurality of utterances in time accordance with the optimal matching path result,
    wherein the quantizer, the convergence tester, and the partitioning logic are further configured to repeat the quantizing, comparing, matching, and partitioning until the at least one comparison result does not exceed any at least one predefined threshold value.

11. The apparatus of claim 10, wherein the at least one comparison result is a variance measure.

12. The apparatus of claim 10, wherein the at least one comparison result is an accuracy measure.

13. The apparatus of claim 10, wherein the at least one comparison result is a variance measure and an accuracy measure, and wherein the convergence tester is configured to first calculate the variance measure, and second, if the variance measure does not exceed a first predefined threshold value, calculate the accuracy measure.

14. The apparatus of claim 13, wherein the matching comprises matching the first utterance with the plurality of template vectors if either the variance measure exceeds the first predefined threshold value or the accuracy measure exceeds a second predefined threshold value.

15. The apparatus of claim 10, wherein the partitioning logic is configured to perform a dynamic time warping computation.

16. The apparatus of claim 10, wherein the partitioning logic comprises K-means speech segmentation logic.

17. The apparatus of claim 10, further comprising an endpoint detector coupled to the segmentation logic and configured to detect endpoints of the first utterance.

18. An apparatus configured to create speech templates for use in a speaker-independent speech recognition system, the apparatus comprising:

a processor, and a storage medium coupled to the processor and containing a set of instructions executable by the processor to segment each utterance of a first plurality of utterances to generate a plurality of time-clustered segments for each utterance, each time-clustered segment being represented by a mean, quantize the plurality of spectral means for all of the first plurality of utterances to generate a plurality of template vectors, compare each one of the plurality of template vectors with a second plurality of utterances using a dynamic time warping calculation to generate at least one comparison result, match the first plurality of utterances with the plurality of template vectors if the at least one comparison result exceeds at least one predefined threshold value, to generate an optimal matching path result, partition the first plurality of utterances in time in accordance with the optimal matching path result, and repeat the quantizing, comparing, matching, and partitioning until the at least one comparison result does not exceed any at least one predefined threshold value.

19. The apparatus of claim 18, wherein the at least one comparison result is a variance measure.

20. The apparatus of claim 18, wherein the at least one comparison result is an accuracy measure.

21. The apparatus of claim 18, wherein the at least one comparison result is a variance measure and an accuracy measure, and wherein the set of instructions is executable by the processor to first calculate the variance measure, and second, if the variance measure does not exceed a first predefined threshold value, calculate the accuracy measure.

22. The apparatus of claim 21, wherein the set of instructions is further executable by the processor to match the first utterance with the plurality of template vectors if either the variance measure exceeds the first predefined threshold value or the accuracy measure exceeds a second predefined threshold value.

23. The apparatus of claim 18, wherein the set of instructions is executable by the processor to match partitioning logic is configured to match the first utterance with the plurality of template vectors by performing a dynamic time warping computation.

24. The apparatus of claim 18, wherein the set of instructions is executable by the processor to partition the first utterance by performing a K-means speech segmentation computation.

25. The apparatus of claim 18, wherein the set of instructions is further executable by the processor to detect endpoints of the first utterance.

26. A processor-readable medium containing a set of instructions executable by a processor to:

segment each utterance of a first plurality of utterances to generate a plurality of time-clustered segments for each utterance, each time-clustered segment being represented by a spectral mean;

quantize the plurality of spectral means for all of the first plurality of utterances to generate a plurality of template vectors;

compare each one of the plurality of template vectors with a second plurality of utterances using a dynamic time warping calculation to generate at least one comparison result;

match the first plurality of utterances with the plurality of template vectors if the at least one comparison result exceeds at least one predefined threshold value, to generate an optimal matching path result;

partition the first plurality of utterances in time in accordance with the optimal matching path result; and repeat the quantizing, comparing, matching, and partitioning until the at least one comparison result does not exceed any at least one predefined threshold value.

* * * * *